US005692850A

United States Patent [19]

Kimble et al.

[11] Patent Number: 5,692,850

[45] Date of Patent: Dec. 2, 1997

[54] HIGH VISIBILITY COUPLER FOR FRONT END LOADER

[75] Inventors: Allen E. Kimble, Cuyahoga, Ohio; Thomas E. Gebauer, Dewitt, Iowa

[73] Assignee: JRB Company, Inc., Akron, Ohio

[21] Appl. No.: 593,136

[22] Filed: Feb. 1, 1996

Related U.S. Application Data

[63] Continuation-in-part of Ser. No. 280,338, Jul. 25, 1994, Pat. No. 5,529,419.

[51] Int. Cl.$^{6}$ .............................. A01B 51/00; E02F 9/00; B66F 11/00

[52] U.S. Cl. ................................ 403/24; 37/468; 172/273

[58] Field of Search ................................ 403/24; 37/468, 37/231; 414/723; 172/275, 273, 272; D15/28, 32

[56] References Cited

U.S. PATENT DOCUMENTS

| | | | |
|---|---|---|---|
| 3,760,883 | 9/1973 | Birk | 172/273 |
| 4,068,959 | 1/1978 | Pemberton | 172/273 X |
| 4,625,988 | 12/1986 | Witchey et al. | 172/273 X |
| 4,708,579 | 11/1987 | Baird et al. | 172/272 X |
| 4,850,789 | 7/1989 | Zimmerman | 172/272 X |
| 5,141,385 | 8/1992 | Tibbatts et al. | 414/723 |
| 5,310,275 | 5/1994 | Lovitt | 403/24 X |
| 5,338,148 | 8/1994 | Rönnblom | 414/723 X |
| 5,529,419 | 6/1996 | Gebauer | 403/24 |
| 5,562,397 | 10/1996 | Albright | 37/468 X |

FOREIGN PATENT DOCUMENTS

| | | | |
|---|---|---|---|
| 278571 | 8/1988 | European Pat. Off. | 37/468 |
| 137533 | 8/1982 | Japan | 37/468 |
| 013835 | 1/1983 | Japan | 37/468 |

*Primary Examiner*—Terry Lee Melius
*Assistant Examiner*—Christopher J. Novosad
*Attorney, Agent, or Firm*—Renner, Kenner, Greive, Bobak, Taylor & Weber

[57] ABSTRACT

A high visibility coupler for front end loader implements that is selectively mountable to the extendable arms of a front end loader and is attachable to implements, such as a fork. The structure of the coupler is such that it has a plurality of parallel lift ribs that are perpendicularly interconnected by cross ribs to form an open lattice type structure, thereby allowing the operator of the front end loader to easily see and manipulate the fork or other attachment, so that the object to be picked up can be easily and safely engaged. One embodiment of the high visibility coupler for front end loaders includes a male master, a carriage and a movable implement such as a fork. The male master includes a plurality of parallel lift ribs that are perpendicularly interconnected by cross members to form an opening wherein the male master is received and carried by lift pistons operative with the lifting arms. The male master carries a carriage which has openings aligned with the opening of the male master. The carriage also has parallel ribs that are perpendicularly interconnected by cross tubes to form an open lattice type structure. One of the ribs includes a hook notch and carriage hole so that the carriage can be carried and secured to the male master. The carriage also includes a slide rod which receives a collar of an implement in such a manner that the implement can be adjusted to any desired position. The structure of the alternative embodiment also allows for the easy visualization of objects to be engaged by the implement.

16 Claims, 7 Drawing Sheets

HIGH VISIBILITY COUPLER FOR FRONT END LOADER

CROSS REFERENCE TO RELATED APPLICATION

This is a continuation-in-part of patent application Ser. No. 08/280,338 filed Jul. 25, 1994, now U.S. Pat. No. 5,529,419 issued Jun. 25, 1996, for "High Visibility Coupler for Front End Loader."

TECHNICAL FIELD

Generally, this invention relates to quick couplers for front end loader implements. Specifically, this invention relates to a quick coupler which has a lattice type structure to provide high visibility of the implement connected thereto. More particularly, this invention relates to a quick coupler system with a lattice type male master receiving a carriage, wherein the carriage carries an adjustable implement, such as the tines of a fork.

BACKGROUND OF THE INVENTION

Front end loaders are powered vehicles running on wheels or tracks having hydraulically operated upper and lower pairs of arms extending from the front of the vehicle. The arms often operate in tandem in a linked parallelogram arrangement and perform useful work by means of attached implements such as a bucket, scoop, plow, fork, or the like. It is often desirable to change implements and, for this purpose, quick couplers have been developed. Such coupler systems employ a male master mounted on the upper and lower arms of a front end loader adapted for mating engagement with female couplers attached to the various implements. Incorporated herein by reference is U.S. Pat. No. 4,708,579, which fully discloses a hydraulically or manually actuated implement coupler for front end loaders.

A shortcoming of prior systems, especially those using a fork-type implement, is that the object to be engaged cannot be seen by the operator of the front end loader. Often, even the forks themselves are obscured from view by the framework of the implement. Such shortcomings give rise to inefficient operation of the front end loader with such implements by slowing such operations. Additionally, with the operator blinded by the implement itself, damage to items being manipulated by the fork is an ever-present possibility, as is damage to surrounding structure. Accordingly, there is a need in the art for maintaining the strength and durability of present coupler designs, while allowing the operator of the front end loader to see the object to be engaged by the fork or other implement, thus greatly increasing the ease of use of the front end loader with a fork or other similar type attachment while preventing damage to the item to be manipulated.

Since the operator of a front end loader is normally seated behind the coupler and, in normal operations, must look through the coupler to see the load to be engaged by the implement, such as when loading palletized materials with forks, there is a need in the art for a coupler which maximizes visibility to the load and coupler by removing structural members from the required line of sight as much as possible, while maintaining structural integrity.

Based upon the foregoing limitations of current front end loaders it is also apparent that there is a need for a coupler system which includes a male master that has a lattice type structure, a carriage which also has a lattice type structure, wherein the openings of the male master and the carriage are aligned. There is also a need for a coupler system that has an open male master, an open carriage and an implement, such as a fork with tines that are positionally adjustable upon the carriage.

SUMMARY OF INVENTION

Thus, it is a general aspect of the invention to allow operators of front end loaders to see the items to be lifted by a fork or other similar type implement.

A further aspect of the invention is to provide a coupler for a front end loader that is safe, reliable, easy-to-use, and which has characteristics similar to those of other quick couplers.

Yet another aspect of the invention is to provide a quick coupler for front end loader implements that is made from conventional materials, can be produced at reasonable costs, and adapted for implementation with a wide variety of front end loaders and implements.

Still another aspect of the present invention is to provide a coupler system with a positional implement.

Yet a further aspect of the invention is to provide a quick coupler system for front end loaders wherein the coupler system has a male master with a lattice type structure.

Still another aspect of the present invention is to provide a quick coupler for front end loaders wherein the coupler system has a carriage with a lattice type structure wherein the openings of the carriage are aligned with the openings of the male master.

Yet another aspect of the present invention is to provide a quick coupler system for front end loaders wherein the male master has a visual indicator for indicating when the male master has positively engaged the carriage.

Still another aspect of the present invention is to provide a quick coupler system for front end loaders wherein the coupler system has implements that are slidably received upon the carriage and which do not interfere with the open structure of either the male master or the carriage.

The foregoing and other aspects and advantages of the invention, which will be made apparent as the specification proceeds, are achieved by a high visibility coupler system for a front end loader with lifting arms, comprising: a male master adapted to be carried by a front end loader, the male master having at least one sight opening; a carriage mountably received by the male master; and at least one implement slidably received by the carriage, wherein the implement is positionable where desired.

The present invention also provides a male master adapted for use with a front end loader and a carriage, wherein the front end loader has lifting arms, comprising: a pair of outer lift ribs; a pair of inner lift ribs; a pair of center ribs; means for interconnecting the pair of center ribs to one another; flat plate means for interconnecting the center ribs to respective inner lift ribs; rib plate means for interconnecting the outer lift ribs to respective inner lift ribs; means for receiving lifting arms between respective outer lift ribs and inner lift ribs; and means for mounting the implement carriage between respective inner lift ribs and center ribs.

The present invention also provides a carriage for use with a male master carried by the arms of a front end loader and for carrying an implement, comprising: a pair of outer carriage ribs; a pair of inner carriage ribs; means for interconnecting the pair of outer carriage ribs and the pair of inner carriage ribs to each other; and means for receiving the male master on one of the pair of outer carriage ribs and the pair of inner carriage ribs, wherein the pair of outer carriage ribs, the pair of inner carriage ribs and the interconnecting means form a plurality of openings aligned with an opening in the male master so as to allow the operator to see any item to be picked up by the front end loader.

BRIEF DESCRIPTION OF THE DRAWINGS

Reference is now made to the accompanying drawings, wherein.

When referring to elements shown in the drawings and referred to in the specification, corresponding numerals are used to facilitate comparison therebetween.

PREFERRED EMBODIMENT FOR CARRYING OUT THE INVENTION

Figure 1:
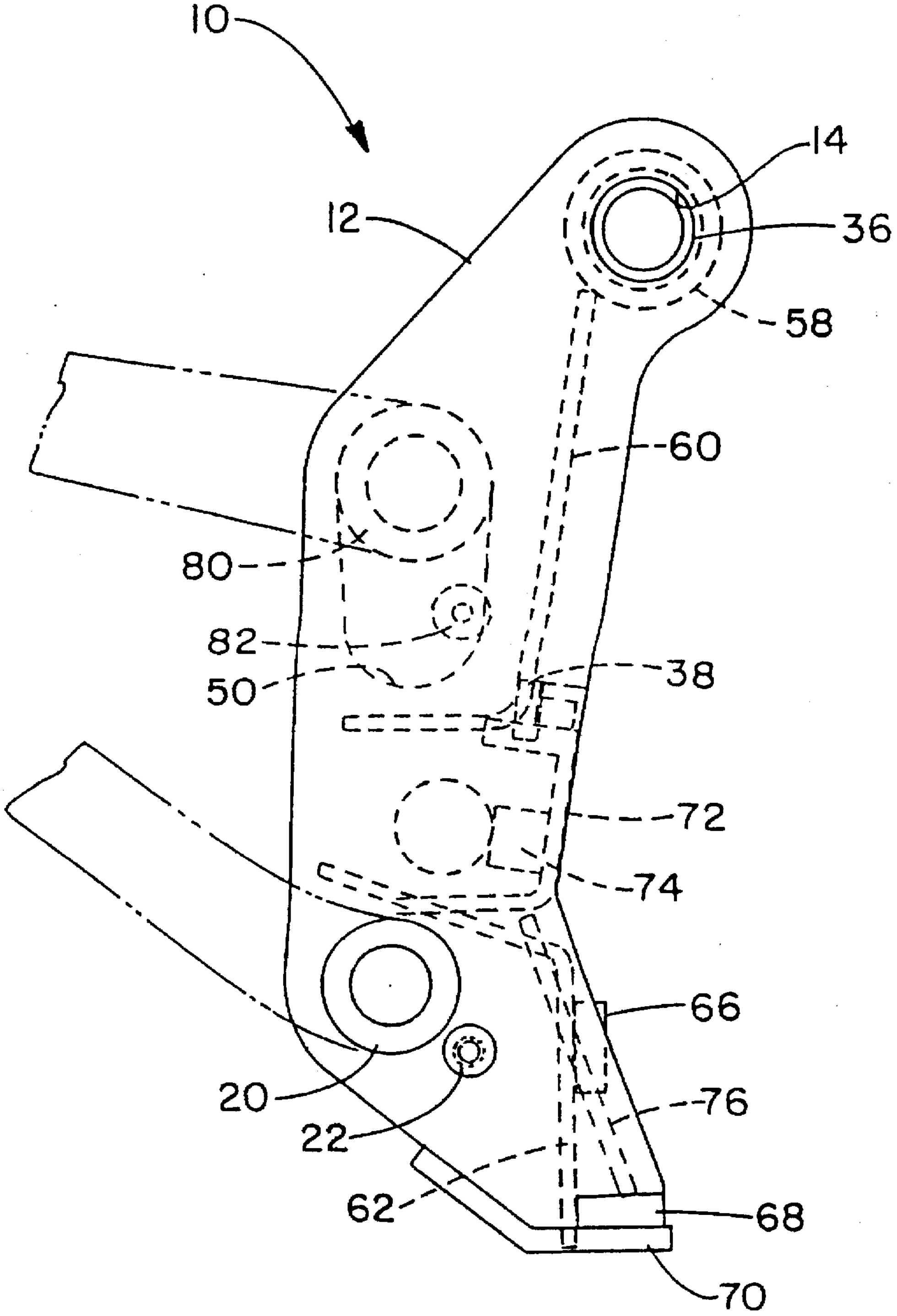
FIG. 1 is a side elevational view of a high visibility coupler attached to the loading ends of an upper and lower pair of front end loader arms (remainder of arms and of loader are not shown)
Figure 2:
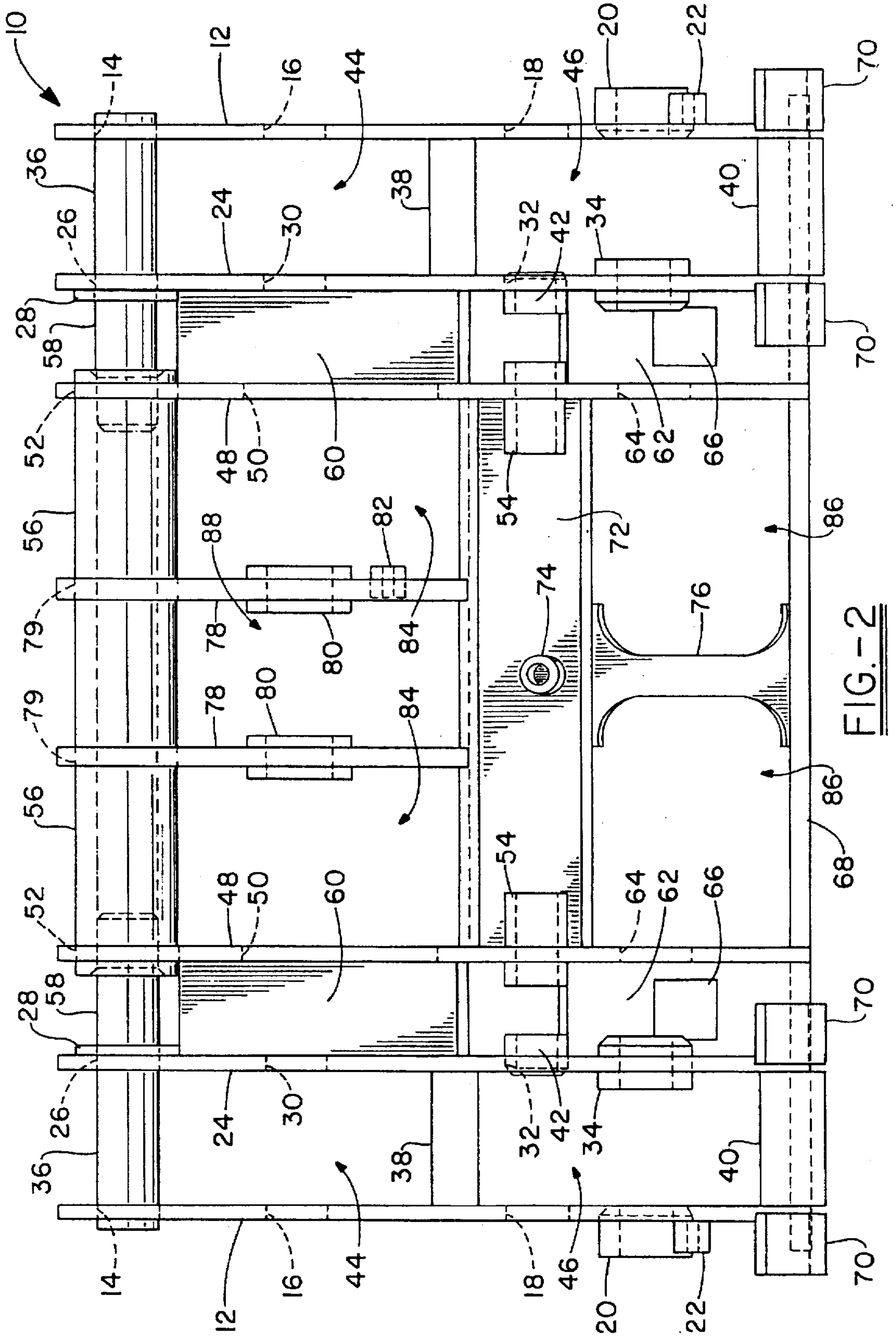
FIG. 2 is a rear elevational view of the high visibility coupler.

Reference now is particularly made to the details of the structure shown in the drawings. The male portion of a high visibility coupler is designated generally as numeral 10. As can be seen in FIGS. 1 and 2, the coupler 10 comprises a pair of outer lift ribs 12, each having at its top end an outer coupling pin hole 14, first and second outer guide holes 16 and 18, respectively in the middle portion, and an outer lift rib boss 20 extending outwardly at the bottom thereof. A lift rib round nut 22 is located slightly below each outer lift rib boss 20. It will be appreciated that the ribs 12 are typically of steel plate construction.

Referring now to FIG. 2, a pair of inner lift ribs 24, that are substantially parallel to the outer lift ribs 12, have an inner coupling pin hole 26 aligned with the outer coupling pin hole 14, with a coupling pin boss 28 on the inner side of each inner lift rib. Each inner lift rib 24 also has first and second inner guide holes 30 and 32, respectively, substantially aligned with the first and second outer guide holes 16 and 18, and an inner lift arm boss 34 that is substantially aligned with outer lift arm boss 20. The outer lift ribs 12 are securably and perpendicularly interconnected to their corresponding inner lift ribs 24 at their tops by a pair of coupling pins 36 through the coupling pin holes 14 and 26. The outer lift ribs 12 are also securably and perpendicularly interconnected to their corresponding inner lift ribs 24 at their mid-portions by a roll back bar 38 and at their bottoms by a dump stop bar 40. The inner lift ribs 24 also have a plunger boss 42 that extends inwardly and is securably connected to the second inner guide hole 32. Like the outer lift ribs 12, the inner ribs 24, the roll back bars 38 and the dump stop bars 40 are typically of steel plate construction.

As seen in FIG. 2, it should be appreciated that the outer and inner lift ribs 12, 24, the coupling pins 36, and the stop roll back bar 38 form an opening 44. In a similar fashion, the stop roll back bar 38, the dump stop bar 40, and the lift ribs 12, 24 form an opening 46.

Substantially parallel to the inner lift ribs 24 are a pair of plunger ribs 48, each having a plunger rib slot 50 in its upper half that is substantially aligned with the first pair of outer and inner guide holes 16 and 30, the plunger ribs also have a pair of cross tube holes 52 that are substantially aligned with the coupling pin holes 14 and 26, and a plunger housing 54 that is substantially aligned with the plunger boss 42 of each inner lift rib 24. The plunger ribs 48 are securably and perpendicularly interconnected at their tops by a cross tube 56, which is securably connected inside the cross tube holes 52. A bridge pin 58, which extends from the appropriate coupling pin 36, is securably interconnected to the ends of the cross tube 56. The plunger ribs 48 are also securably connected to inner lift ribs 24 by a top plate 60, which is between the bridge pin 58 and the plunger housing 54, and by a bottom plate 62, which is between the plunger housings 54 and the bottoms of the plunger ribs 48 and inner lift ribs. The plunger ribs 48 also have a plunger guide hole 64 that is substantially aligned with the outer and inner lift arm bosses 20 and 34. There may also be a stop bearing plate 66 securably connected to the bottom plate 62 or the top plate 60. Typically, the plunger ribs 48, the top plate 60, and the bottom plate 62 are of steel plate construction.

The respective bottom ends of the inner and outer lift ribs 12 and 24, and the plunger ribs 48 are securably and perpendicularly interconnected to a bottom bar 68. There may be a plurality of skid plates 70 strategically placed on the underside of the bottom bar 68 and connected to the ribs 12, 24, 48 to alleviate wear and tear. A cylinder mount plate 72 joins the plunger ribs 48 at their mid-portions, with a cylinder mount boss 74 somewhere near its center. The bottom of the cylinder mount plate 72 may be securably connected to the top of the bottom bar 68 by a middle brace 76.

A pair of dump link ribs 78 are substantially parallel to the plunger ribs 48, and have a pair of substantially aligned cross tube holes 79 that are securably and perpendicularly interconnected to the cross tube 56. The dump link ribs 78 extend downwardly and are securably attached to the top of the cylinder mount plate 72. The dump link ribs 78 have a corresponding set of dump link bosses 80, that are substantially aligned with the plunger rib slot 50 and the first outer and inner guide holes 16 and 30. One of the dump link ribs 78 has a dump link round nut 82 located slightly below only one of the dump link bosses 80. It will be appreciated that the bottom bar 68, the cylinder mount plate 72, the middle brace 76, and the dump link ribs 78 are of steel plate construction.

Referring still to FIG. 2, as those skilled in the art will appreciate, the plunger ribs 48, the dump link ribs 78, the cross tube 56, and the cylinder mount plate 72 form openings 84. Likewise, the dump link ribs 78, the cylinder mount plate 72, and the bottom bar 68 form an opening 86. The opening 86 may be intersected by the middle brace 76. Finally, the dump link ribs 78, the cross tube 56 and the cylinder mount plate 72 form an opening 88. Thus, the aforementioned openings 44, 46, 84, 86 and 88 provide dear sight lines for the object to be engaged by an implement, such as a fork.

Although any method of attaching and detaching a coupler 10 to a front end loader may be utilized, the plurality of bosses 20, 34, 80 and 74, located on the outer lift ribs 12, inner lift ribs 24, dump link ribs 78 and cylinder mount plate 72 respectively, comprise one possible method of mounting the high visibility coupler 10 to a front end loader. It should further be appreciated that the lift arms (not shown) of the front end loader are received between the outer lift arm boss 20 and the inner lift arm boss 34 and are detachably mounted thereto. In a similar fashion, the dump link arm (not shown) of the front end loader is received by the dump link bosses 80 and is detachably mounted thereto. Furthermore, the operator of the front end loader can control, usually by hydraulics, the operation of the lift arms and dump link arm so that the high visibility coupler 10 may be pivotally maneuvered at either detachable mounting to manipulate the attached implement.

Additionally, although any method of attaching and detaching an implement to the coupler 10 may be utilized, the plurality of bosses 42 and 54 located on the inner lift ribs 24 and plunger ribs 48 respectively, in cooperation with the bridge pin 58 between the inner lift ribs 24 and plunger ribs 48, comprise one possible method of engagement for affixing an implement to the high visibility coupler 10. As those skilled in the art will appreciate, a pair of hooks (not shown) integral with an implement will be mountably supported and received by the bridge pins 58. Furthermore, the implement will have protruding eyes (not shown) that are detachably mounted by engagement with plunger pins passing through said eyes and between the plunger boss 42 and plunger housing 54. Of course, the use of such manually or hydraulically actuated plunger pins to engage and secure an implement to a coupler is well known. Thus, with the implement mountably received upon the high visibility coupler 10, the operator of the front end loader may more easily control the movement of the implement.

Therefore, in actual operation, once the high visibility coupler 10 has been attached to a front end loader, with any typical implement mounted thereto, the implement may be controlled by the operator in a manner well known in the art. The benefit of the present invention resides in the numerous openings 44, 46, 84, 86 and 88 that are provided by the lattice type structure of the coupler 10. These openings 44, 46, 84, 86 and 88 allow the operator of the front end loader to clearly visualize the objects, such as pallets or equipment, to be engaged by the attached implement. The benefits of the coupler 10 described herein quickly become apparent. Objects to be engaged are less likely to be damaged by the implement being used, and accordingly, the operator will be more productive and time efficient while utilizing the high visibility coupler. Furthermore, the structure of the coupler 10 is such that the strength thereof is maintained for engaging and lifting heavy loads.

Figure 3:
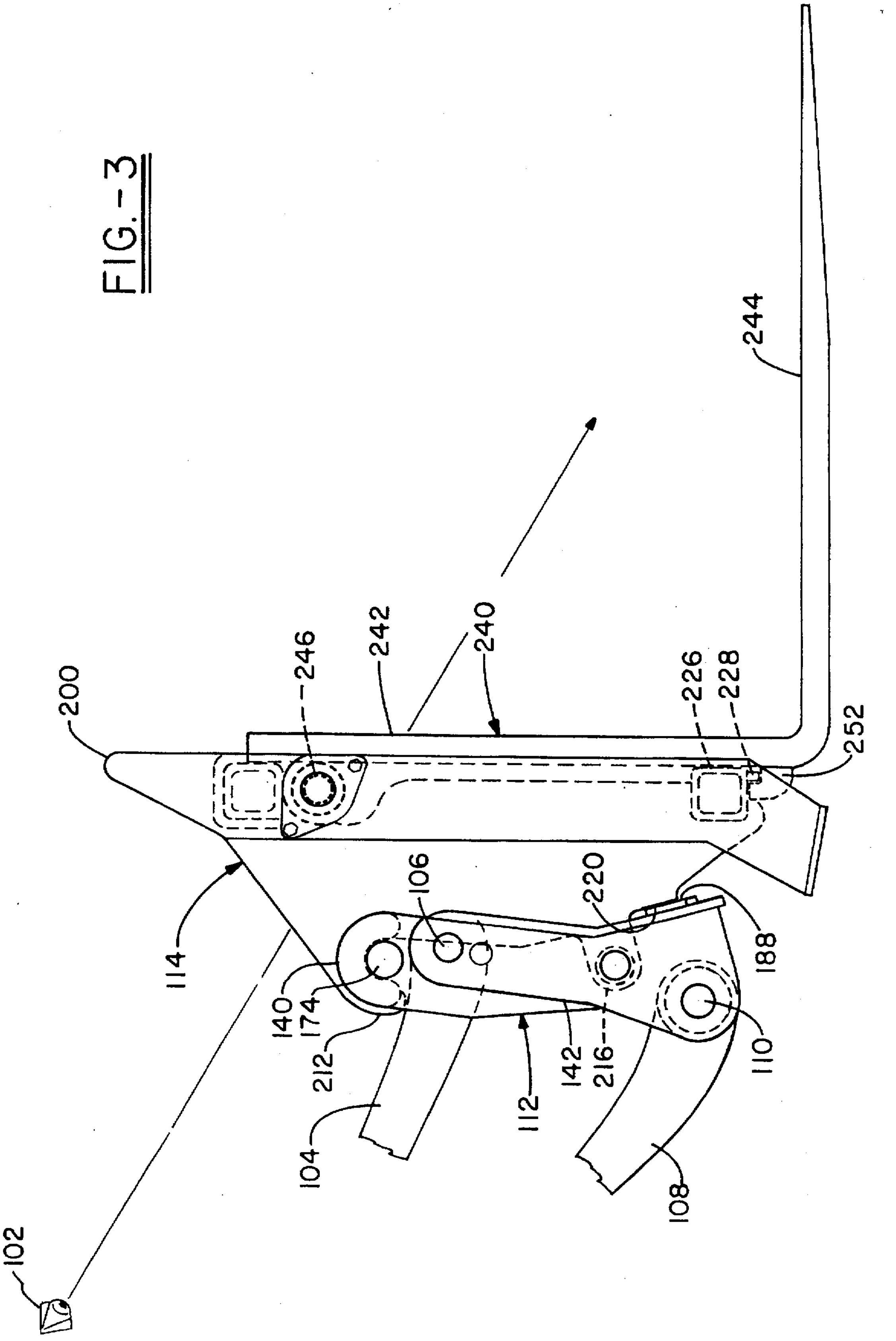
FIG. 3 is a schematic view of a high visibility quick coupler system according to the present invention.

Reference now is particularly made to the details of the structure shown in FIG. 3 and subsequent drawings. A high visibility coupler system is designated generally as numeral 100. As can be seen in FIG. 3, the high visibility coupler system 100 is carried by a front end loader (not shown) which has a pair of upper lifting arms 104 that include upper lift pistons 106 and a pair of lower lifting arms 108 which likewise include lower lift pistons 110. The upper lift pistons 106 and lower lift pistons 110 are controlled by an operator so as to engage and carry a male master 112. The male master is coupled to and carries thereon a carriage 114. The carriage 114 is adapted and configured so as to receive an implement 240, such as a tine or tines of a fork, so that the operator of the front end loader 102 can easily see the object that is to be lifted, moved or engaged by the implement 240. The carriage 114 is configured such that the implement 240 is slidably received thereon and can be positioned as desired to engage the object desired. As seen in the drawings, the male master 112 and the carriage 114 are configured so that there are aligned sight openings for the easy visualization of objects to be engaged by the tines 240.

Figure 4:
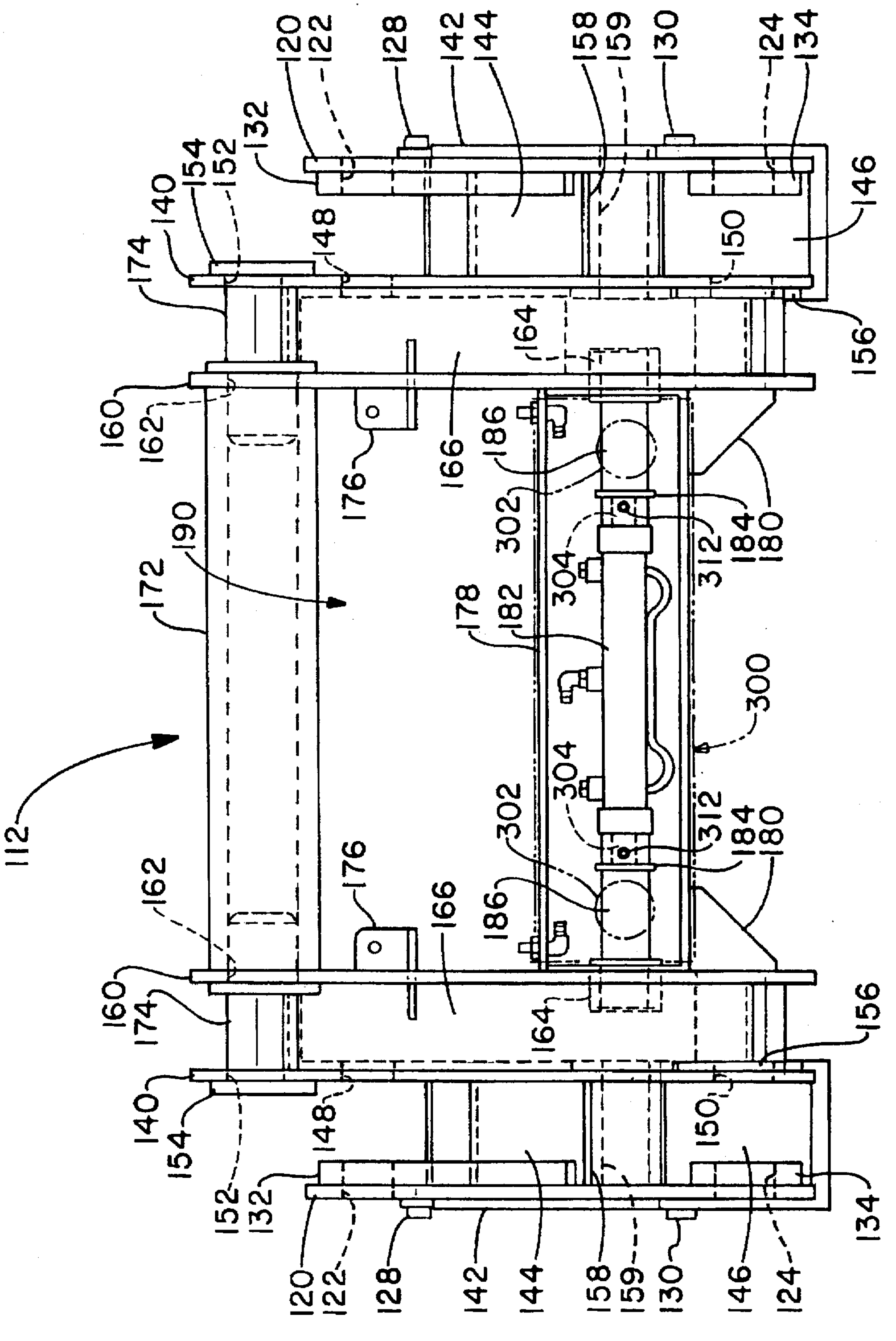
FIG. 4 is a rear elevational view of a male master portion of the quick coupler system.
Figure 5:
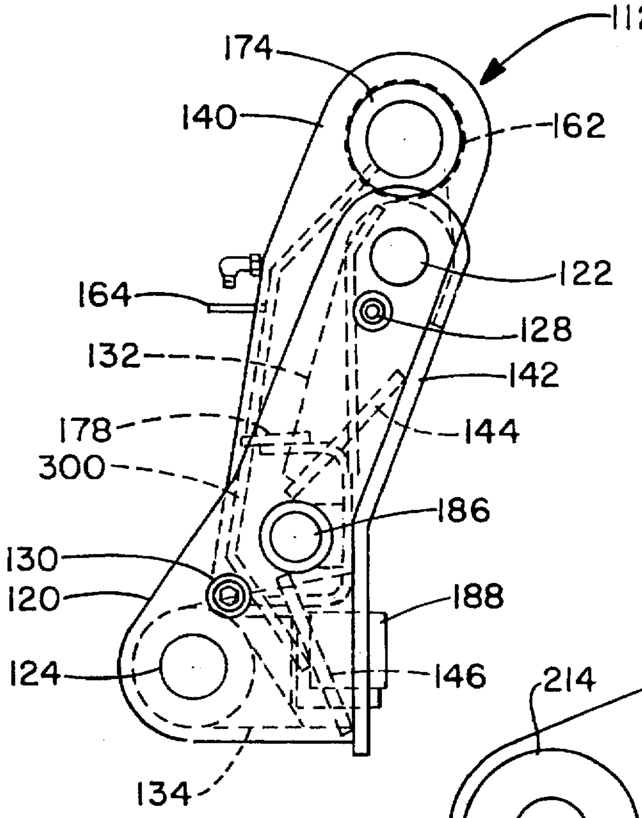
FIG. 5 is a side elevational view of the male master coupler portion of the quick coupler system.

Referring now to FIGS. 4 and 5, the structure of the male master 112 will be presented. The male master 112 includes a pair of parallel outer lift ribs 120 which have an outer guide hole 122 and another outer guide hole 124. Extending outwardly from the outer lift ribs 120 is a round nut 128 and a round nut 130. Extending inwardly from the outer lift ribs 120 is a boss 132 that surrounds the outer guide hole 122 and a boss 134 that surrounds the outer guide hole 124.

A pair of parallel inner lift ribs 140, which are substantially parallel with the outer lift ribs 120, are secured to the nearest respective outer lift rib 120 by a face plate 142, an upper rib plate 144 and a lower rib plate 146. The inner lift ribs 140 also have an inner guide hole 148 and another inner guide hole 150. It will be appreciated that the inner guide holes 148 are aligned with the outer guide holes 122 and, in a similar manner, the inner guide holes 150 are aligned with the outer guide holes 124. The inner lift ribs 140 also have a top pin hole 152. A top pin boss 154 outwardly extends from the lift ribs 140 and surrounds the top pin hole 152. A lower pin boss 156 extends inwardly from the inner lift ribs 140 and surrounds the inner guide hole 150. Interconnecting the outer lift ribs 120 and the respective inner lift ribs 140 is a housing plunger 158 which has a cylinder guide hole 159.

A pair of parallel center ribs 160 are respectively positioned in between the inner lift ribs 140. The center ribs 160 each have a cross tube hole 162. Extending outwardly from each center rib 160 is a boss plunger 164 which is aligned with the cylinder guide hole 159 of the respective inner lift ribs 140. The center ribs 160 are interconnected to the inner lift ribs 140 by a flat plate 166. A cross tube 172 interconnects the center ribs 160 to one another through their respective cross tube holes 162. Also interconnecting the inner lift ribs 140 to their respective center rib 160 is a top pin 174, where the top pin is received within the cross tube 172. A bulkhead plate 176 extends inwardly from each center rib 160. A cylinder plate 178 interconnects the center ribs 160 to one another. A gusset 180 is employed to interconnect each center rib 160 with the respective edge of the cylinder plate 178. It will be appreciated that the cylinder plate 178 is configured in a C-shape and carries therein a hydraulic cylinder 182. The hydraulic cylinder 182 is operative with a plunger assembly 184 which has plungers 186 extendable outwardly therefrom. Moreover, the plungers 186 are receivable within the boss plunger 164 and, when fully extended, are received within the cylinder guide holes 159.

A stop plate 188 extends forwardly from between the inner lift ribs 140 and the respective center ribs 160. It will be appreciated that the center ribs 160, the cross tube 172 and the cylinder mount plate 178 form a sight opening 190.

It will be understood then that the lifting arms 104 and 108 of the front end loader 102 are received and engageable with the male master 112. In particular, the upper lift pistons 106 are received within the respective outer guide holes 122 and the inner guide holes 148. In a similar fashion, the lower lift pistons 110 are received by the outer guide holes 124 and the inner guide holes 150. As such, the male master 112 is carried by the front end loader 102 between the outer lift ribs 120 and the inner lift ribs 140. Therefore, the lifting arms 104 and 108 do not interfere with the operator's line of sight through the sight opening 190. It will also be appreciated that this configuration allows for the easy engagement and disengagement of the male master 112 from the lifting arms 104, 108 and their respective lift pistons 106, 110.

Figure 7:
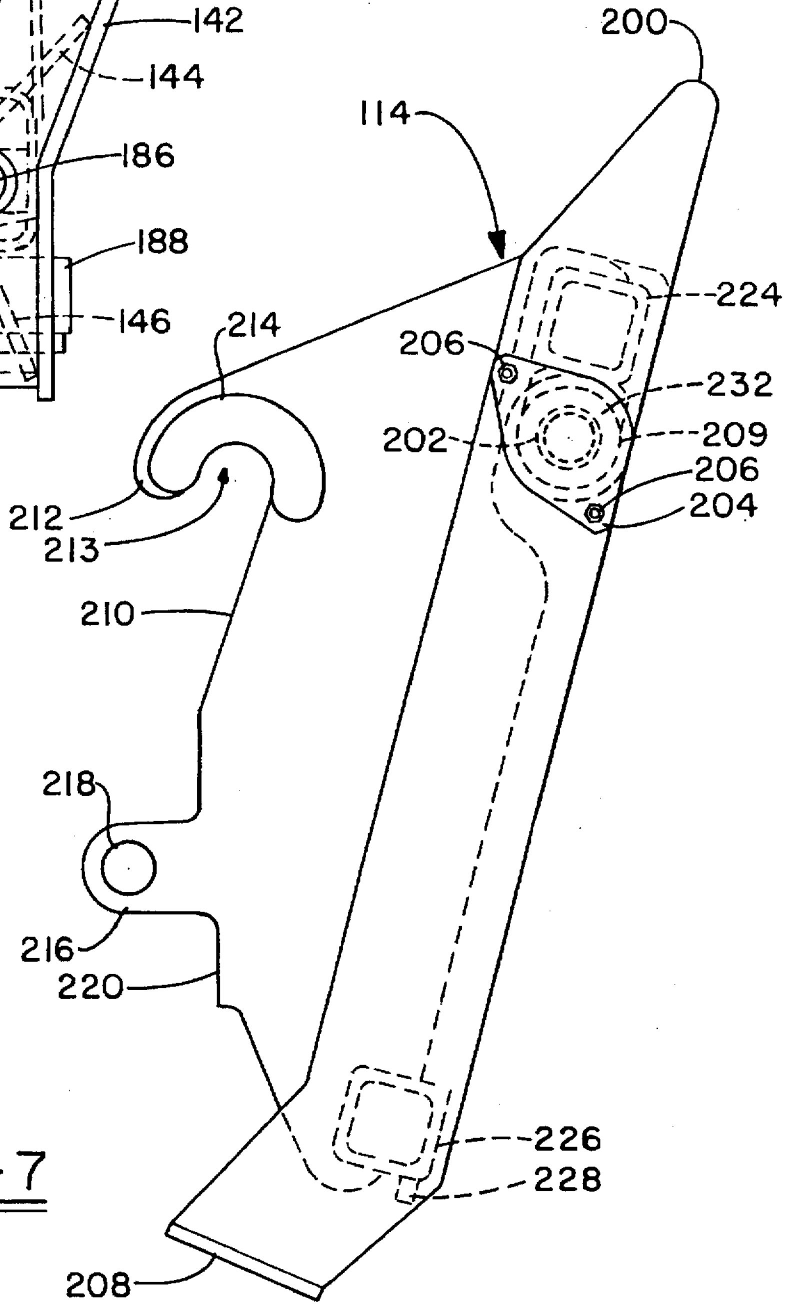
FIG. 7 is a side elevational view of the carriage portion of the quick coupler system.
Figure 6:
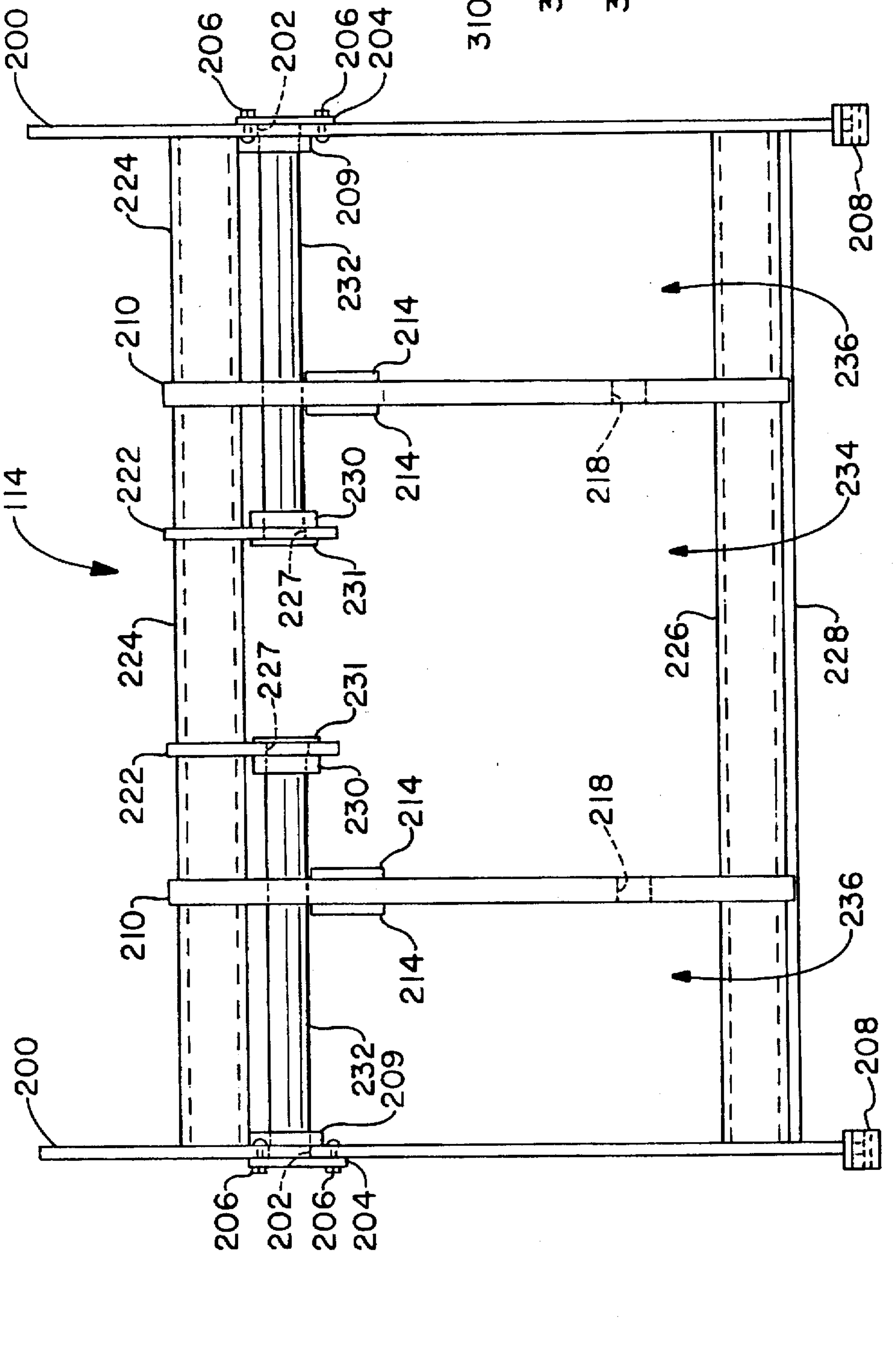
FIG. 6 is a rear elevational view of a carriage portion of the quick coupler system.

Referring now to FIGS. 6 and 7 it can be seen that the carriage 114 provides a similar lattice type structure. In particular, the carriage 114 has outer carriage ribs 200 that are parallel with one another. Each outer carriage rib 200 has a rod hole 202 that is covered by attachment plates 204. Fasteners 206 are employed to selectively secure the attachment plates 204 over the rod holes 202. Secured to the bottom end of the outer carriage ribs 200 are skid plates 208. Extending inwardly from the outer carriage ribs 200 is an outer boss 209 which surrounds the rod hole 202.

Inner carriage ribs 210 are parallel with one another and respective outer carriage ribs 200. As best seen in FIG. 7, the inner carriage ribs 210 have a hook 212 with a hook notch 213. Surrounding the hook notch 213, on both sides of the inner carriage ribs 210, is a lift arm boss 214. Also extending from the inner carriage ribs 210 is a finger 216 which has a carriage hole 218. Disposed below the finger 216 is a bearing plate 220.

A pair of rod ribs 222 which are parallel with one another and the inner carriage ribs 210 are positioned in such a manner that a top tube 224 interconnects at the upper ends of the respective outer carriage ribs 200, the inner carriage ribs 210 and the rod ribs 222. In a similar manner, a bottom tube 226 interconnects the lower ends of the outer carriage ribs 200 and inner carriage ribs 210 to each other. Disposed on the underside of the bottom tube 226 is a tine flange 228 which extends between the outer carriage ribs 200. Each rod rib 222 has a rod rib hole 227. Extending outwardly from the rod ribs 222 is a rod rib boss 230 that surrounds the rod rib hole 227. Extending inwardly from each rod rib 222 is a rod rib cap 231.

A pair of slide rods 232 are carried between the outer carriage ribs 200 and their nearest respective rod ribs 222. At one end the slide rods 232 are received within the rod rib hole 227 and are held in place by the rod rib cap 231. At the other end the slide rods 232 are received within the rod holes 202 and secured therein by the attachment plates 204. It will be appreciated that the inner carriage ribs 210, the top interconnecting tube 224 and the bottom interconnecting tube 226 form a center opening 234. In a similar manner, the outer carriage ribs 200 and their respective inner carriage ribs 210, along with the top interconnecting tube and bottom interconnecting tube 224 and 226, respectively, form side openings 236.

It will be understood that the carriage 114 is received and carried by the male master 112. In particular, the hook notches 213 are received and engaged by the top pins 174. Additionally, the outwardly extending plungers 186 slidably engage the carriage holes 218. It will be further appreciated that the inner carriage ribs 210 are aligned between the inner lift ribs 140 and the center ribs 160. As such, the center opening 234 is aligned with the sight opening 190. It will also be appreciated that the sight openings 236 are only impeded by the outer lift ribs 120 and the plates connecting the outer lift ribs 120 to the inner lift ribs 140. Furthermore, when the carriage 114 is received and carried by the male master 112, the bearing plate 220 is in contact with and supported by the stop plate 188.

Figure 8:
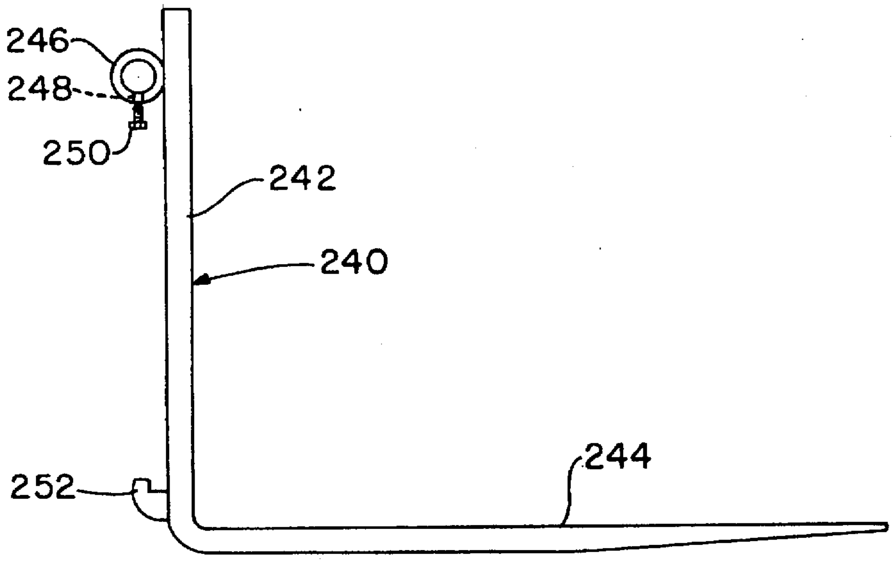
FIG. 8 is a side elevational view of an implement, such as a tine, used in conjunction with the quick coupler system.

Referring now to FIG. 8, it can be seen that the implement or tine 240 has a vertical portion 242 and a horizontal portion 244. Secured to the upper end of the vertical portion 242 is a collar 246 which has an inner diameter larger than the outer diameter of the slide rod 232. Additionally, the collar 246 has a set hole 248 which receives a set screw 250. Extending rearwardly from the vertical portion 242 is a hook member 252 that is mateable with the tine flange 228 on the carriage 114.

The tine 116 is carried upon the carriage 114 by first aligning the collar 246 between the rod hole 202 and the rod rib hole 227. The slide rods 232 are then inserted through the rod hole 202 and into the collar 246 until received by the rod rib cap 231. The attachment plates 204 are then secured by fasteners 206 over the rod hole 202 so that the slide rods 232 are secured. It will then be appreciated that the tines 140 are slidable and can be placed in any desired position upon the slide rod 232. When a preferred position is determined, the set screw 250 is tightened so as to secure the L-member 240 to the slide rods 232. It will be appreciated that during the positioning of the implement or tine 240 upon the slide rod 232 that the hook member 252 is also slidable upon the tine flange 228. The tine can also be secured by spring loaded pins connected to the line that mate with corresponding holes in the carriage 114.

As seen in FIGS. 4, 5, 9, and 10, a cover plate 300 is securably fastened to the cylinder plate 178 to enclose the plunger assembly 184. Those skilled in the art will appreciate that the purpose of the cover plate 300 is to prevent damage and the entry of foreign objects into the plunger assembly 184 which might interfere with the operation thereof. The cover plate 300 has an inspection hole 302 and an aperture 304 at each end thereof.

A visual indicator 310 is connected to each plunger assembly 184 through the corresponding aperture 304 of the cover plate 300. A threaded rod 312 extends from each plunger 186 through each respective aperture 304. The visual indicator 310 includes a plunger linkage arm 314 which has a hole 316 for receiving the threaded rod 312 which is secured thereto by a fastening device such as a nut or the like. The plunger linkage arm 314 also has a pivot hole 318 through which is rotatably connected an indicator linkage arm 320. The indicator linkage arm 320 has a pivot hole 322 that is aligned with the pivot hole 318 for receiving a pivot bolt 323 that is secured by a nut 324 and the appropriate washers to allow the plunger linkage arm 314 and the indicator linkage arm 320 to move with respect to one another and rotate about their respective pivot holes 318, 322. The indicator linkage arm 320 also has an indicator hole 325 which is aligned with the aperture 304 of the cover plate 300. The visual indicator 310 includes a head 326 with an extending pointer 328. Additionally, the head 326 has a hole 330 which is aligned with the indicator hole 325 and the aperture 304. A pin 332 is inserted through the hole 330, the aperture 304 and the indicator hole 325 in such a manner that the pointer 328 is positioned in a substantially vertical position as viewed by the operator of the front end loader. The pin 332 is connected to the indicator linkage arm 320 to allow the head 326 and the indicator linkage arm 320 to rotate depending upon the direction of travel of the plunger assembly 184.

Figure 9:
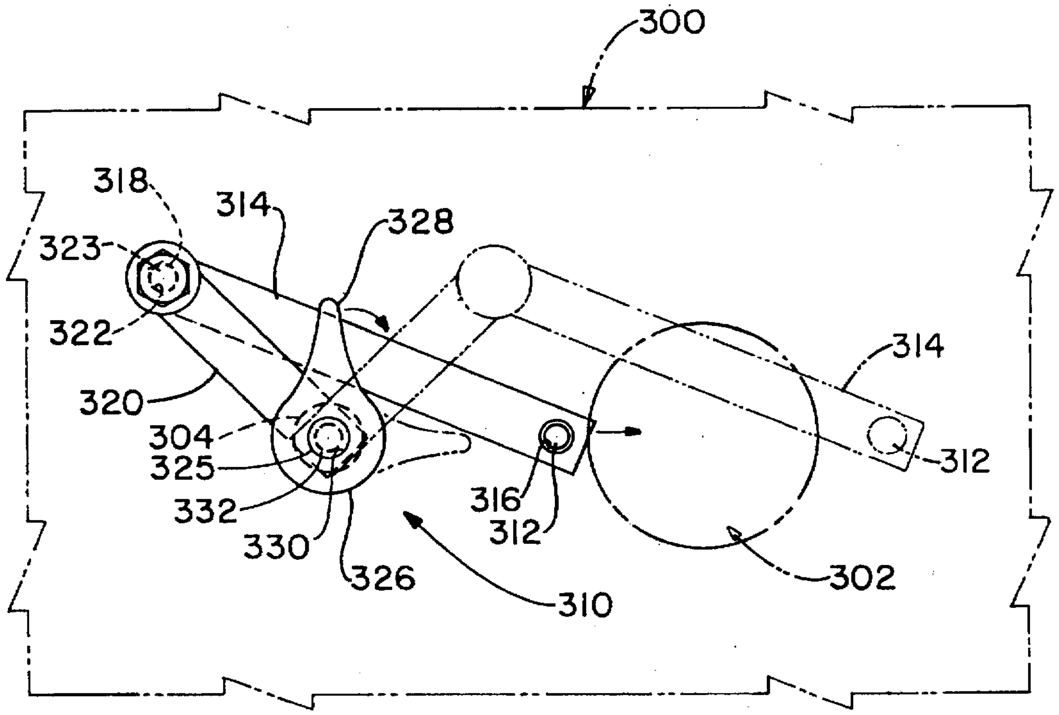
FIG. 9 is a partial front elevational view of a visual indicator mechanism.
Figure 10:
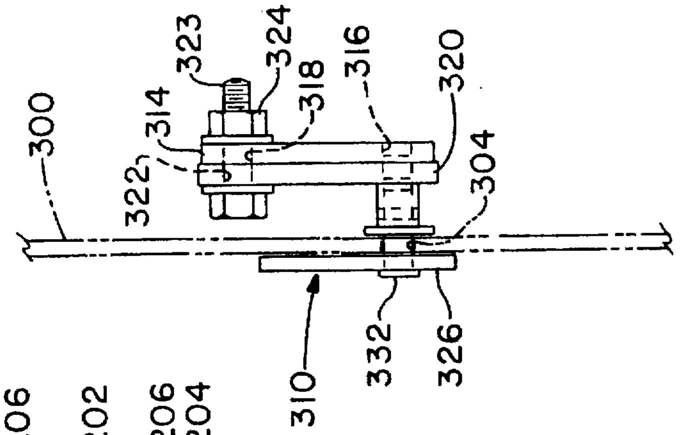
FIG. 10 is a partial side elevational view of the visual indicator.

As seen in FIG. 9, which shows the right half of the cover plate 300, as the plunger assembly 184 is coupled to the visual indicator 310 by virtue of the plunger linkage arm 314 connection to the threaded rod 312. In operation, as the plunger 186 is extended the plunger linkage arm 314 is pulled and rotated in a toward the center ribs, correspondingly, the indicator linkage arm 320 is pulled and rotated to rotate the pointer 328 into a substantially horizontal position as viewed by the operator of the front end loader. When the plunger 184 is withdrawn, the linkage arms 314 and 320 are pushed and rotated in an opposite direction to rotate the pointer 328 back to a substantially vertical position.

The visual indicator 310 allows an operator to visually confirm that the plunger assembly has engaged the appropriate rib of the male master 112. The inspection holes 302 within the cover plate 300 allow an operator to check the mechanical connections between the threaded rod 312 and the visual indicator 310 and the hydraulic connections between the hydraulic lines and the plunger assembly 184. It will be appreciated then that the visual indicator 310, which extends from the aperture 304, provides a clear designation of when the plunger assembly 184 has coupled the male master 112 to the carriage 114.

It should be apparent then from the above description of the structure of the high visibility coupler system 100 and the interconnections between the front end loader 102, the male master 112, the carriage 114 and the implement 240 that numerous advantages over the prior art are realized. First, by virtue of the openings within the male master and the carriage and their alignment with each other, the high visibility coupler system 100 allows for the easy visualization by the front end loader operator of any object that is to be engaged by the implement or implements 240. Yet another advantage of the high visibility coupler system 100 is that the implement or implements 240 are interchangeable and securable upon the carriage 114. This allows the front end loader 102 to be easily modified or reconfigured so that various tasks can be performed with minimal delay. Still yet another advantage of the embodiment provided by the high visibility coupler 100 is that the tine flange prevents the implement or implements from inadvertently moving or becoming misaligned while engaging an object.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the appended claims.

What is claimed is:

1. A high visibility coupler system for a front end loader with lifting arms, comprising:

a male master adapted to be carried by a front end loader, said male master having at least one sight opening;

a carriage mountably received by said male master, said carriage having at least one slide rod; and at least one implement having a circular collar slidably received by said slide rod, wherein said collar is selectively positionable and securable around said slide rod.

2. The high visibility coupler system according to claim 1, wherein said carriage has a plurality of openings such that said sight opening is aligned with at least one of said plurality of openings.

3. The high visibility coupler system according to claim 2, wherein said implement has a vertical member and a horizontal member, said vertical member having said collar which receives a set screw.

4. The high visibility coupler system according to claim 3, wherein said set screw secures said collar to said carriage.

5. The high visibility coupler system according to claim 4, wherein said male master comprises:

a pair of outer lift ribs having first and second outer guide holes;

a pair of inner lift ribs having first and second inner guide holes;

a pair of center ribs carrying a plunger assembly;

a cross tube interconnected between said pair of center ribs;

a pair of top pins interconnecting said inner lift ribs to respective center ribs; and a plurality of rib plates interconnecting said outer lift ribs to respective inner lift ribs;

wherein the lifting arms of the front end loader are received within said first inner and outer guide holes and said second inner and outer guide holes.

6. The high visibility coupler system according to claim 4, wherein said carriage comprises:

a pair of outer carriage ribs;

a pair of inner carriage ribs;

a pair of rod ribs;

a first tube interconnecting said pair of outer carriage ribs, said pair of inner carriage ribs and said pair of rod ribs to each other; and a second tube interconnecting said pair of outer carriage ribs and said pair of inner carriage ribs to each other;

wherein each of said inner carriage ribs has a hook with a notch and a finger with a carriage hole so that each said carriage hole receives plungers from a plunger assembly carried by said male master.

7. A male master adapted for use with a front end loader and a carriage wherein the front end loader has upper and lower lifting arms, comprising:

a pair of outer lift ribs;

a pair of inner lift ribs;

a pair of center ribs;

means for interconnecting said pair of center ribs to one another;

flat plate means for interconnecting said center ribs to respective said inner lift ribs;

rib plate means for interconnecting said outer lift ribs to respective said inner lift ribs;

means for receiving lifting arms between respective said outer lift ribs and inner lift ribs;

means for mounting the carriage between respective said inner lift ribs and center ribs; and a plunger assembly carried between said center ribs and enclosed by a cover plate having an aperture therethrough from which extends a visual indicator for allowing visual confirmation of the position of said plunger assembly to provide a clear designation of when said plunger assembly has coupled the male master to the front end loader.

8. The male master according to claim 7, wherein said pair of center ribs and said means for interconnecting center ribs form a sight opening therebetween.

9. The male master according to claim 8, wherein said pair of outer lift ribs have first and second outer guide holes, said pair of inner lift ribs have first and second inner guide holes aligned with respective said first and second outer guide holes, said first outer and inner guide holes receiving the upper lifting arms of the front end loader and said second inner and outer guide holes receiving the lower lifting arms of the front end loader.

10. The male master according to claim 7, further comprising:

a pair of top pins interconnecting said center ribs to respective ones of said inner lift ribs; and wherein said plunger assembly has a pair of extendable plungers, wherein the carriage is carried by said top pins and said plungers when said plungers are outwardly extending.

11. The male master according to claim 10, wherein said means for interconnecting center ribs include:

a cross tube secured between said center ribs, wherein said cross tube receives at each end thereof one of said top pins; and a cylinder plate secured between said center ribs, said plunger assembly being carried by said cylinder plate.

12. A carriage for use with a male master carried by the arms of a front end loader and for carrying an implement, comprising:

a pair of outer carriage ribs;

a pair of inner carriage ribs;

means for interconnecting said pair of outer carriage ribs and said pair of inner carriage ribs to each other;

means for receiving the male master on one of said pair of outer carriage ribs and said pair of inner carriage ribs, said pair of outer carriage ribs, said pair of inner carriage ribs and said interconnecting means forming a plurality of openings aligned with openings in the male master to allow an operator to view an item to be picked up by the front end loader;

a pair of rod ribs disposed between said pair of inner carriage ribs, wherein said pair of rod ribs are carried by said interconnecting means; and a pair of slide rods interconnected between said pair of outer carriage ribs and one of said pair of inner carriage ribs and said pair of rod ribs, said pair of slide rods being adaptable to receive at least one implement.

13. The carriage according to claim 12, wherein said interconnecting means has a flange adaptable to receive a mating portion of the implement.

14. The carriage according to claim 13, wherein said receiving means has a hook with a notch and a finger with a carriage hole, wherein the male master is adaptable to receive and engage said notch and said carriage hole.

15. The carriage according to claim 14, wherein each of said pair of inner carriage ribs has a bearing plate that is supported by the male master when the male master is carried by said receiving means.

16. The carriage according to claim 13, wherein each of said pair of outer carriage ribs has a skid plate at a bottom end thereof.

* * * * *